United States Patent
Labegorre et al.

(10) Patent No.: US 10,280,114 B2
(45) Date of Patent: May 7, 2019

(54) DIRECT-FIRED INCLINED COUNTERFLOW ROTARY KILNS AND USE THEREOF

(71) Applicant: L'Air Liquide, Societe Anonyme pour l'Etude et l'Exploitation des Procedes Georges Claude, Paris (FR)

(72) Inventors: Bernard Labegorre, Paris (FR); Carlo Renna, Maule (FR); Remi Tsiava, Saint Germain-les-Corbeil (FR); Sergio Fernandes, Alges (PT)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 15/539,910

(22) PCT Filed: Dec. 24, 2015

(86) PCT No.: PCT/EP2015/081248
§ 371 (c)(1),
(2) Date: Jun. 26, 2017

(87) PCT Pub. No.: WO2016/102709
PCT Pub. Date: Jun. 30, 2016

(65) Prior Publication Data
US 2017/0362122 A1    Dec. 21, 2017

(30) Foreign Application Priority Data
Dec. 26, 2014    (EP) ..................................... 14398016

(51) Int. Cl.
*F27B 7/12*    (2006.01)
*F27B 7/00*    (2006.01)
(Continued)

(52) U.S. Cl.
CPC ............ *C04B 7/4438* (2013.01); *C04B 2/104* (2013.01); *C04B 7/364* (2013.01); *F23G 5/20* (2013.01);
(Continued)

(58) Field of Classification Search
CPC ........ F26B 17/30; F26B 17/18; F26B 17/205; F26B 3/04; F26B 3/06; F26B 25/06;
(Continued)

(56) References Cited

U.S. PATENT DOCUMENTS 4,318,713 A * 3/1982 Lee .......................... C10J 3/005
48/203
4,591,362 A * 5/1986 Yudovich ................... C10J 3/06
201/33
(Continued)

FOREIGN PATENT DOCUMENTS

EP    0 451 648    10/1991
EP    2 631 582    8/2013

OTHER PUBLICATIONS

International Search Report and Written Opinion for PCT/EP2015/081248, dated Feb. 16, 2016.

*Primary Examiner* — Gregory A Wilson
(74) *Attorney, Agent, or Firm* — Christopher J. Cronin

(57) ABSTRACT

Method of operating a long direct-fired inclined counterflow rotary kiln for the thermal treatment of material and counterflow rotary kiln adapted for same, whereby material to be treated is introduced into the kiln at the inlet end and treated material is evacuated from the kiln at the outlet end, whereby a main combustion zone extends inside the kiln over a distance of ¼ to ⅓ of the internal length $L_{int}$ of the kiln, whereby a supplementary combustion zone in which supplementary combustion takes place with an oxygen-rich oxidant extends inside the kiln over a distance from the inlet end of at most ¼ of the internal length $L_{int}$, and whereby no
(Continued)

combustion takes place in a heat exchange zone located between the main combustion zone and the supplementary combustion zone.

12 Claims, 1 Drawing Sheet

(51) Int. Cl.

| | |
|---|---|
| *C04B 7/44* | (2006.01) |
| *C04B 7/36* | (2006.01) |
| *F23G 5/20* | (2006.01) |
| *F27B 7/34* | (2006.01) |
| *F27B 7/36* | (2006.01) |
| *C04B 2/10* | (2006.01) |
| *F27B 7/14* | (2006.01) |
| *F27B 7/33* | (2006.01) |
| *F27B 7/38* | (2006.01) |

(52) U.S. Cl.
CPC ................ *F27B 7/14* (2013.01); *F27B 7/33* (2013.01); *F27B 7/34* (2013.01); *F27B 7/362* (2013.01); *F27B 7/383* (2013.01); *F23G 2207/30* (2013.01); *F23G 2900/52002* (2013.01); *Y02E 20/344* (2013.01)

(58) Field of Classification Search
CPC ..... C03B 5/0277; C03B 5/0338; C21B 11/06; C21B 13/08; C21D 9/0031; F27B 7/00; F27B 7/12; F27B 7/362; F23G 2900/52002
See application file for complete search history.

(56) References Cited

U.S. PATENT DOCUMENTS

| | | | |
|---|---|---|---|
| 5,482,458 A * | 1/1996 | Kyffin | C04B 20/061 432/103 |
| 6,672,865 B2 * | 1/2004 | Hansen | F27B 7/00 110/246 |
| 8,900,341 B2 * | 12/2014 | Dosaj | C22B 5/04 75/684 |
| 9,080,813 B1 * | 7/2015 | Deckebach | F27B 7/20 |
| 9,557,058 B2 * | 1/2017 | Rehmat | F27B 7/36 |
| 9,828,288 B2 * | 11/2017 | Colannino | C04B 7/4438 |
| 9,885,478 B1 * | 2/2018 | May | F27B 7/00 |
| 2010/0294700 A1 * | 11/2010 | Coates | C10B 1/10 208/400 |
| 2014/0166465 A1 * | 6/2014 | Varma | C10B 1/10 201/37 |
| 2016/0169181 A1 | 6/2016 | Graham et al. | |
| 2017/0016670 A1 * | 1/2017 | Grassi | F27B 7/36 |

* cited by examiner

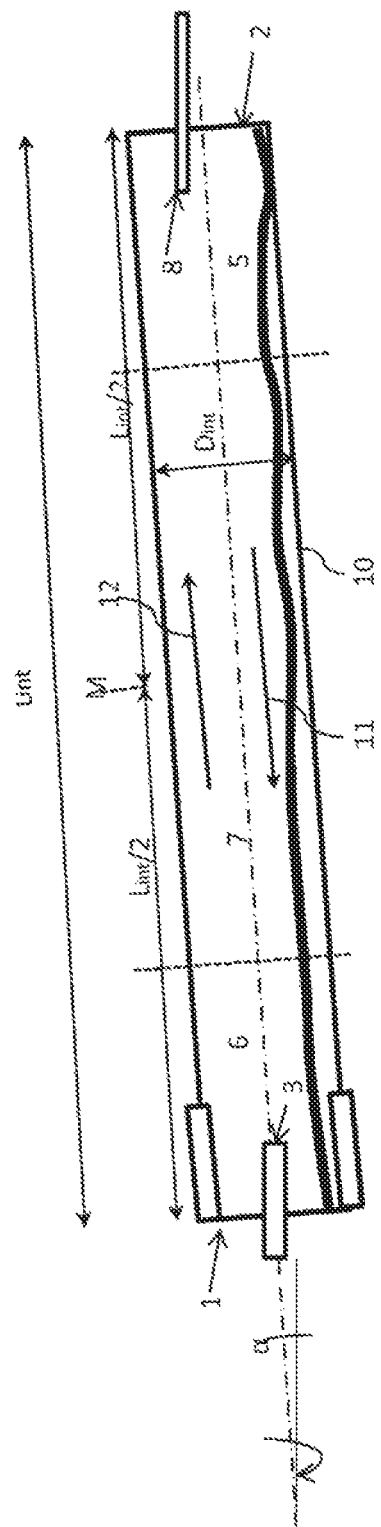

DIRECT-FIRED INCLINED COUNTERFLOW ROTARY KILNS AND USE THEREOF

CROSS-REFERENCE TO RELATED APPLICATIONS

This application is a § 371 of International PCT Application PCT/EP2015/081248, filed Dec. 24, 2015, which claims § 119(a) foreign priority to EP patent application EP 14398016.7, filed Dec. 26, 2014.

BACKGROUND

Field of the Invention

The present invention relates to long direct-fired inclined counterflow rotary kilns.

A rotary kiln is a refractory-lined substantially cylindrical heated vessel which rotates around a longitudinal axis and in which material is subjected to thermal treatment at elevated temperatures.

Direct-fired rotary kilns are heated by combustion of a fuel with oxidant inside the kiln.

Related Art

In what follows, fuel and oxidant are collectively referred to as combustion reactants.

In counterflow direct-fired rotary kilns, the material to be treated is introduced into the kiln at an inlet end located at one of the longitudinal extremities of the kiln and travels through the kiln in the longitudinal direction thereof. The treated material is evacuated from the outlet end located at the opposite longitudinal extremity of the kiln. In order to heat the kiln, fuel and oxidant are introduced into the kiln at the outlet end so as to generate combustion of the fuel with the oxidant in the kiln and the combustion gases generated thereby travel through the kiln in counterflow to the material (i.e. from the outlet end towards the inlet end) before being exhausted from the kiln at the inlet end.

Counterflow rotary kilns are usually slightly inclined with respect to the horizontal, with the inlet end having a higher position than the outlet end, thereby promoting the movement of the material through the kiln from the inlet end towards the outlet, while also promoting the movement of the hot combustion gases from the outlet end to the combustion gas exhaust at the inlet end.

Rotary kilns and in particular inclined rotary kilns can have a wide range of dimensions typically depending on factors which determine the required residence time of the material in the rotary kiln, such as: the nature of the material to be treated and the physical and/or chemical/thermal treatment process to which the material is subjected in the kiln. The internal kiln diameter is selected in function of the gas flow rate through the kiln and the required gas velocity in the kiln at standard/nominal kiln operation.

In the present context, a rotary kiln is considered to be "long" when the internal length $L_{int}$ is at least 20 m, typically from 20 to 100 m, and when the internal diameter $D_{int}$ is at most one tenth (1/10) of the internal length $L_{int}$.

Long direct-fired inclined rotary kilns are commonly used for calcining material such as cement or lime.

Inside a long direct-fired inclined rotary kiln, one typically distinguishes two distinct zones: a primary combustion zone and a heat exchange zone. The primary combustion zone or, in short, combustion zone, is the part of the rotary kiln at the exit end of the kiln where combustion of the fuel with the oxidant takes place. The heat exchange zone, which typically bridges the longitudinal middle M of the rotary kiln, is the part of the kiln upstream of the combustion zone (in terms of the travel direction of the material) and in which the material is heated by the hot combustion gases generated by said combustion as they travel to the combustion gas exhaust at the inlet end. The heat exchange zone is thus important for maximizing the use made of the heat generated in the combustion zone.

Higher temperatures in the combustion zone normally imply higher production capacity and efficiency. However, excessive temperatures in the combustion zone can cause refractory damage and over-burnt material.

The corresponding trade-off results in a compromise which, in long direct-fired rotary kilns such as lime kilns, generally leads to low combustion gas temperatures at the inlet end of the kiln, also known as the "cold end".

The occurrence of low combustion gas temperatures at the cold end severely restricts heat transfer to the material, for example: lime mud, in that part of the kiln.

One known manner of at least partially overcoming this problem is to install a "curtain" of metal chains in the cold end of the kiln. These chains facilitate the heat transfer between the relatively low temperature combustion gases and the lime mud. An example of such a chain curtain is described in US-A-2006169181. These chain-curtain systems can be complicated and expensive to install and maintain.

SUMMARY OF THE INVENTION

It is an aim of the present invention to increase heat transfer to the material inside the rotary kiln near the inlet end of a long inclined direct-fired rotary kiln without having to resort to the chain-curtain system.

In accordance with the present invention, this is achieved by the following method of operating a direct-fired counterflow rotary kiln for the thermal treatment of material, the rotary kiln presenting a longitudinal axis around which the kiln rotates and having an internal length Lint of from 20 m to 100 m and an internal diameter Dint and furthermore presenting a ratio Lint/Dint from 10 to 100. The longitudinal axis of the kiln is inclined with respect to the horizontal plane and extends between an upper inlet end of the kiln and a lower outlet end of the kiln.

The material to be treated is introduced into the kiln at the inlet end. It is subjected to thermal treatment within the kiln, after which the thus treated material is evacuated from the kiln at the outlet end.

Thermal energy is generated in the kiln by introducing a main fuel and a main oxidant into the kiln at the outlet end so as to generate a main combustion of said main fuel with said main oxidant in a main combustion zone which extends inside the kiln over a distance of ¼ to ⅓ of the internal length $L_{int}$ of the kiln from the outlet end.

Combustion gases generated by said main combustion travel through the kiln from the main combustion zone towards the inlet end through a heat exchange zone in which no combustion takes place, but in which heat is transferred from the combustion gases to the material travelling in countercurrent/counterflow with the combustion gases. The heat exchange zone is located upstream of the main combustion zone, typically immediately upstream of the main combustion zone.

If the main fuel is completely combusted in the main combustion zone, then the combustion gases leaving the main combustion zone are free of combustible substances.

However, when the combustion of the main fuel in the main combustion zone is incomplete, then the combustion gases leaving the main combustion zone contain combustible substances such as, for example, CO.

Finally, the combustion gases are evacuated from the kiln via a flue gas outlet situated at the inlet end of the kiln.

According to the present invention, supplementary oxidant, and optionally also supplementary fuel, are introduced into the kiln at the inlet end so as to combust:

a) any combustible substances in the combustion gases from the main combustion zone, if present, and, b) if supplementary fuel is introduced into the kiln, the supplementary fuel with said supplementary oxidant inside the supplementary combustion zone of the kiln.

This combustion with the supplementary oxidant is referred to as "supplementary combustion".

The supplementary combustion takes place in a supplementary combustion zone inside the kiln upstream of the heat exchange zone and extending over a distance from the inlet end of at most ¼ of the internal length $L_{int}$. The combustion gases generated by said supplementary combustion are evacuated from the kiln together with the combustion gases generated by the main combustion via the flue gas outlet of the kiln.

A supplementary oxidant with an oxygen content of from 50% vol to 100% vol, preferably of at least 80% vol, more preferably of at least 90% vol and most preferably of at least 97% vol is used to achieve said supplementary combustion inside the kiln.

Introducing supplementary oxidant without supplementary fuel is only envisaged when the combustion gases generated by the main combustion contain combustible substances, also known in the art as "residual fuel", such as CO.

In the present context, the "main combustion zone" is understood to extend from the outlet end of the kiln to the point within the kiln, i.e. upstream of the outlet end, where the main combustion stops. Likewise, the "supplementary combustion zone" is understood to extend from the inlet end of the kiln to the point within the kiln, i.e. downstream of the inlet end, where the supplementary combustion stops.

In the present context and unless otherwise specified, the terms "upstream" and "downstream" are used with respect to the travel direction of the material (to be treated) in the rotary kiln.

BRIEF DESCRIPTION OF THE FIGURES

FIG. 1 illustrates a long counterflow rotary kiln suitable for use in the present invention.

DETAILED DESCRIPTION OF THE INVENTION

It had already been proposed in EP-A-0451648 to inject oxidant and fuel at the outlet end in combination with injecting oxidant and optionally fuel at the inlet end of short rotary kilns and in particular of mobile rotary kilns. In EP-A-0451648, the aim was to provide a desirable temperature profile with reduced temperature gradients and with a more uniform temperature from the feed inlet end to the feed outlet end of the kiln so as to increase the throughput of the rotary kiln, without creating a high potential for refractory damage or conditions favorable for NOx formation.

The rotary kilns described in EP-A-0451648 clearly do not constitute long rotary kilns as defined in the context of the present invention. Moreover, due to the different dimensions, most notably shorter length, of said furnaces and/or the nature of the material treated in the furnace, such as waste containing combustible matter, these kilns do not present a heat transfer zone bridging the longitudinal middle M of the furnace in which no combustion takes place. Rather, in the furnaces according to EP-A-0451648 combustion takes place over the entire length of the rotary kiln.

As a consequence, should such a furnace be used for the thermal treatment of non-combustible material, a lower percentage of the heat generated by combustion would be transferred to the material than is the case in long direct-fired rotary kilns.

As indicated above, the present invention makes it possible to increase the heat transfer to the material at the cold end of the kiln without a need to install chain curtains or similar equipment in said cold end.

From EP-A-2631582, there is further known a method for manufacturing cement clinker by means of a system which does not have dedicated, fuel-supplied, pre-calciner equipment and which comprises a rotary thermally insulated tube, acting as a rotary kiln, a main burner placed in a first end of the rotary tube, a riser duct placed at the second end upstream of the rotary tube, a second burner opposite to the main burner for injecting air-propelled fluffy shredded fuel particles from wastes into the rotary tube with a velocity such that combustion of the fluffy shredded fuel particles takes place mainly in the riser duct upstream of the kiln so as to raise the temperature in the riser duct upstream of the kiln to a temperature level where efficient decarbonation of the limestone can take place.

According to EP-A-2631582, combustion of the fluffy shredded fuel particles with the propellant air, both of which are injected by means of the second burner, mainly takes place upstream of the rotary kiln in the riser duct so as to cause decarbonation of the material before it is introduced into the rotary kiln.

The method according to EP-A-2631582 thus does not seek to increase heat transfer to the material inside the rotary kiln by means of supplementary combustion inside kiln at the inlet end.

It will be appreciated that the present invention makes it possible to increase the heat transfer to the charge inside the kiln even when the maximum capacity of the main oxidant supply system has been reached.

The main oxidant of long counterflow rotary kilns is usually air.

The main oxidant may also be oxygen-enriched air. The main oxidant may further be introduced into the kiln as a combination of air and oxygen jets.

The maximum capacity of the main oxidant supply system may be due:

a) To an upper limit of the volume of main oxidant which the main oxidant supply system is capable of providing and/or b) To an upper limit of the pressure drop (in the kiln) which the main oxidant supply system can overcome. Indeed, due to the length of the kiln and the relatively low Dint/Lint ratio of the kiln, the pressure drop over the kiln is substantial.

By injecting the supplementary oxidant and optionally also the supplementary fuel at the inlet end of the kiln, the heat transfer to the material is increased without significantly increasing the pressure drop over the kiln. In effect, as the supplementary oxidant and optionally also the supplementary fuel are introduced at the inlet end of the kiln, the combustion gases generated by the supplementary combustion only travel through the upstream supplementary combustion zone and cause hardly any increase of the pressure drop over the kiln.

For this reason, the present invention also makes it possible to increase the heat transfer to the material at the inlet end of the kiln even when the pressure drop over the kiln is almost at the level of the maximum pressure drop which the flue gas extraction system of the kiln can deal with.

The present invention is of particular interest when the material to be thermally treated has a high moisture content, in particular when the material to be treated is introduced into the kiln as a mud or slurry.

In that case, the first step in the thermal treatment process is a drying step. By increasing the heat transfer to the material at the inlet end of the kiln, drying is accelerated and the distance travelled by the material during the drying step is decreased, thus increasing the thermal treatment capacity of the kiln.

The present invention is also useful for operating a direct-fired counterflow rotary kiln for the thermal treatment of material when at least part of the material is treated in a fuel-supplied pre-calciner before being introduced into the rotary kiln, for example in a process for clinker production in a rotary kiln.

The present invention may also be particularly useful when the supplementary fuel contains water, for example when the supplementary fuel is in the form of a water-containing paste or slurry, and in particular in the form of a combustible waste liquid or paste.

As stated above, the combustion gases from the main combustion zone may contain combustible substances such as CO as a consequence of incomplete combustion of the main fuel in the main combustion zone. This frequently occurs when the main oxidant and the main fuel are introduced into the kiln at a main equivalence ratio from 0.85 to 1.05, preferably from 0.85 to 0.95.

In the present context, the term "equivalence ratio" is used with its conventional meaning, i.e.:

$$\frac{\left(\frac{F}{O}\right)_{actual}}{\left(\frac{F}{O}\right)_{stoichiometric}}$$

whereby:
F=fuel flow rate (whereby the fuel may be a single fuel or a combination of several fuels)
O=oxidant flow rate (whereby the oxidant may be a single oxidant or a combination of several oxidants).

The "main equivalence ratio" refers to the equivalence ratio in the main combustion zone, i.e. the equivalence ratio of the main fuel and the main oxidant. The "supplementary equivalence ratio" refers to the equivalence ratio of the supplementary fuel and the supplementary oxidant.

In the present context, combustion is said to be substantially complete when the partial pressure of residual fuels in the combustion products is lower than 50 mbar.

When the combustion gases from the main combustion zone contain combustible substances, it is possible to introduce only supplementary oxidant and no supplementary fuel into the kiln. When the combustion gases from the main combustion zone contain combustible substances, it is also possible to introduce both supplementary oxidant and supplementary fuel into the kiln. In that case, the supplementary equivalence ratio is less than 1.

Preferably, the combustible substances containing combustion gases from the main combustion zone enter the supplementary combustion zone at a temperature of at least 650° C., preferably of at least 700° C. and more preferably of at least 750° C., but generally not exceeding 1200° C., thus ensuring rapid combustion of said combustible substances inside the kiln when the combustible substances come into contact with said supplementary oxidant.

According to a different embodiment of the invention, the main oxidant and the main fuel are introduced into the kiln at the outlet end so as to provide complete combustion or substantially complete combustion of the main fuel in the main combustion zone. In that case, the combustion gases from the main combustion zone contain little or no combustible substances and both supplementary fuel and supplementary oxidant are introduced into the kiln at the inlet end. The supplementary fuel and supplementary oxidant are then introduced into the kiln at the inlet end so as to provide complete combustion or substantially complete combustion of the supplementary fuel in the supplementary combustion zone.

According to the invention, the main oxidant may be introduced into the kiln in multiple main oxidant jets. In particular, a first portion of the main oxidant may be introduced into the kiln as one or more jets of primary oxidant in contact with a jet of the main fuel and a second portion of the main oxidant may be introduced into the kiln as one or more jets of secondary oxidant separately from the main fuel. For example, primary oxidant may be air provided by an air blower or oxygen from an oxygen source (such as an oxygen container), with secondary oxidant being air from a material cooler for the air-cooling of the thermally treated material leaving the kiln.

At least part and preferably all of the supplementary oxidant is advantageously injected into the kiln supersonically. This allows the supplementary oxidant to penetrate further downstream into the furnace from the inlet end, thereby increasing the residence time of the supplementary oxidant in the rotary kiln. The residence time of the supplementary oxidant in the kiln can also be increased by injecting at least part and preferably all of the supplementary oxidant into the kiln by means of a lance extending into the kiln from the inlet end. A higher penetration distance of the supplementary oxidant in the kiln is also advantageous, in particular when the combustion gases from the main combustion zone contain combustible substances, in that said combustion gases are at a higher temperature when they come into contact with the supplementary oxidant.

According to one advantageous embodiment, the supplementary oxidant is injected into the kiln in a direction parallel to the longitudinal axis of the kiln.

Alternatively, several jets of supplementary oxidant are injected into the kiln with an injection direction so that the injection directions of said supplementary oxidant jets meet at a point located on or in the vicinity of the longitudinal axis of the kiln. The latter configuration is deemed to be particularly useful when the combustion gases from the main combustion zone contain combustible substances.

The heat exchange zone is typically located immediately upstream of the main combustion zone.

As indicated earlier, the present invention is particularly useful when the material to be thermally treated has to be at least partially dried in the supplementary combustion zone.

The material to be treated may, for example, be introduced into the kiln at the inlet end with a water content of from 20 to 35% by weight, preferably of from 24 to 29% by weight, as is typically the case for lime mud.

The main oxidant is typically air, oxygen-enriched air or a combination of air jets and oxygen jets.

The present invention also relates to the use of the method according to the invention for the thermal treatment of material, for example for the production of lime, in particular from lime mud.

In other words, the present invention also relates to a method for the thermal treatment of material in a direct-fired counterflow rotary kiln, whereby said kiln presents a longitudinal axis around which the kiln rotates and whereby said kiln has an internal length Lint of from 20 m to 100 m and an internal diameter Dint and presents a ratio Lint/Dint from 10 to 100. The method for the thermal treatment of material further comprises the steps of any one of the embodiments of the method of operating a rotary kiln as described above.

The present invention also relates to an installation for the thermal treatment of material. Said installation comprises a long direct-fired counterflow kiln which is rotatable around a longitudinal axis. Said axis extends between an upper inlet end and a lower outlet end and is inclined with respect to the horizontal plane. The kiln presents an internal length Lint of from 20 m to 100 m. It has a longitudinal middle M halfway between the inlet end and the outlet end. The kiln also presents an internal diameter Dint so that the ratio Lint/Dint is from 10 to 100.

The installation further comprises a material supply system for supplying material to be treated to the kiln. The material supply system is in fluid connection with the inlet end of the kiln and is adapted for introducing material to be treated at a controlled supply rate into the kiln at the inlet end.

The installation also includes a material evacuation system in fluid connection with the outlet end and adapted to evacuate thermally treated material from the kiln.

At least one main fuel injector and at least one main oxidant injector are located at the outlet end of the kiln. They are adapted for introducing main fuel, respectively main oxidant into a main combustion zone of the kiln which is adjacent the outlet end of the kiln. The at least one main oxidant injector and the at least one main fuel injector are preferably part of a main burner located at the outlet end of the kiln.

A flue gas outlet is situated at the inlet end of the kiln and adapted for evacuating combustion gases from the kiln, The kiln also comprises at least one supplementary oxidant injector and optionally also at least one supplementary fuel injector located at the inlet end of the kiln. The at least one supplementary oxidant injector is adapted for introducing supplementary oxidant into a supplementary combustion zone adjacent the inlet end of the kiln and, if present, the at least one fuel injector is adapted for introducing supplementary fuel into said supplementary combustion zone.

When both a supplementary oxidant injector and a supplementary oxidant injector and a supplementary fuel injector are present, these supplementary injectors are usefully part of a supplementary burner located at the inlet and of the kiln.

In addition, the kiln comprises a longitudinal middle section extending over at least 50% of the internal length Lint of the kiln and in which no oxidant or fuel inlets are present. This middle section bridges the longitudinal middle M of the kiln.

The embodiment of the installation with only at least one supplementary oxidant injector at the inlet end of the kiln and no supplementary fuel injector located at the inlet end of the kiln, is useful for those installations in which the main combustion is incomplete, i.e. whereby the combustion gases generated by the main combustion still contain combustible substances to be combusted with oxidant from the supplementary oxidant injector(s).

The embodiment of the installation with both at least one supplementary oxidant injector at the inlet end of the kiln and at least one supplementary fuel injector located at the inlet end of the kiln, is useful both for installations in which the main combustion is incomplete and for installations whereby the main combustion is complete.

According to a preferred embodiment, at least one supplementary oxidant injector is a supersonic injector and/or in the form of a lance extending longitudinally into the kiln from the inlet end.

The material evacuation system may comprise a cooler for air-cooling the thermally treated material downstream of the kiln. In that case, said cooler may comprise an air outlet in fluid connection with a main oxidant inlet of the kiln, so as to supply cooling air from the cooler as (part or all the) main combustion oxidant to the kiln.

The at least one supplementary oxidant injectors are in fluid connection with a source of an oxidant having an oxygen content of from 50% vol to 100% vol, preferably of at least 80% vol, more preferably of at least 90% vol and most preferably of at least 97% vol. As indicated above, by injecting oxygen-rich oxidant from such oxidant sources as supplementary oxidant, complete or substantially complete combustion is promoted inside the kiln and more specifically inside the supplementary combustion one of the kiln. Examples of such oxidant sources are Air Separation Units, containers containing liquefied oxygen-rich oxidants and pipelines for the supply of liquefied or gaseous oxygen-rich oxidant.

The present invention also includes installations for the thermal treatment of material adapted for use in the different embodiments of the method according to the invention as described above. Thus, the present invention also includes such installations which comprise fuel-supplied pre-calciner equipment upstream of the rotary kiln.

The present invention also relates to the use of any one of the embodiments of the installation according to the invention for the thermal treatment of material, for example for the production of lime or cement.

The present invention and its advantages are illustrated in the following example, reference being made to the FIGURE which is a schematic representation of a long counterflow rotary kiln suitable for use in the present invention.

This example illustrates how the invention described above can bring real advantages to the operation of a rotary kiln, more specifically in the case of a rotary kiln for the production of lime with a production capacity of around 115 t/day as illustrated in the FIGURE.

The rotary kiln is characterized by the following data:

Lint=50 m

Dint=2.4 m

Lint/Dint=20.8

Rotational speed=1.8 rpm

Angle of inclination with respect to the horizontal plane ($\alpha$)=3°

Lime mud is introduced into the kiln at the upper inlet end 2. The material 10 travels through the kiln in direction 11, and is meanwhile being subjected to heat treatment in the kiln, so that burnt lime is obtained at the outlet end 1 of the kiln.

The main burner 3, situated at the outlet end 1 of the kiln, is fed with air as the main oxidant and natural gas as the main fuel. Some liquid fuel oil is also used as an additional main fuel.

Natural gas ~800 Nm3/h

Liquid fuel oil ~210 kg/h

The combustion of the main fuel and the additional main fuel with air takes place in main combustion zone 6 (15 m long) and the combustion gases generated by said main combustion travel through the remainder of the kiln zones 7 in direction 12 to the inlet end 2 of the kiln, where they are evacuated from the kiln via a flue gas outlet (not shown). The kiln is not equipped with a chain curtain near its inlet end 2.

When the rotary kiln is operated according to prior-art practices, i.e. without supplementary combustion, one can thus distinguish two zones in the kiln: the main combustion zone 6 and the remainder of the kiln (zones 7) which acts as a heat exchange zone.

Under the given prior-art operation conditions (main burner power and kiln production rate), the fumes suction system (fan not shown) is already running at its maximum, i.e. at 100% power.

Under these circumstances and when no use is made of the present invention, the production rate is clearly limited by the heat transfer capacity inside the kiln.

In order to increase the production rate, the temperature at the kiln inlet is a key parameter. The lime mud introduced in the kiln is generally around 260° C. with a water content of 24 to 29%. The temperature inside the kiln at the kiln inlet should be above 500° C. in order to guarantee that all the $H_2O$ content of the lime mud is completely dried up sufficiently upstream in the kiln, which is important to get a sufficient and good quality production.

Increasing the burner power of the main burner 3, in particular in order to increase the temperature at the kiln inlet end 2, requires increasing the fan power, which determines the volume flow rate of the combustion gases through the kiln. As, however, the fan is already operating at its maximum, this is not an available option. Moreover, any significant increase in the main burner power would overheat the main combustion zone 6 and damage the kiln liner in that part of the kiln.

According to the example implementing the invention, a supplementary injection of oxygen and fuel takes place through a supplementary burner 8 in a supplementary combustion zone 5 at the kiln inlet end 2. This adds enough energy to keep the temperature of the combustion gases in the supplementary combustion zone 5 above 500° C. and allows an increase of the production rate by 15%.

Three zones can thus be identified along the kiln when the method according to the invention is used:

i. the main combustion zone 6—15 m long, ii. the heat exchange zone 7—20 m long, including the longitudinal middle M of the kiln, and iii. the supplementary combustion zone 5—15 m long.

In the given example, the supplementary burner is a simple pipe-in-pipe burner with nominal power of 750 kW using natural gas as fuel and oxygen as oxidant.

The use of oxygen as oxidant allows a much higher flame temperature with consequent higher efficiency and lower fuel consumption than can be achieved by air combustion. Moreover, an oxy-burner is much more compact than an air firing burner of equivalent power, which greatly facilitates its installation of the supplementary burner 8 at the kiln inlet 2 where the available room is generally very limited.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "an" and "the" include plural referents, unless the context clearly dictates otherwise.

"Comprising" in a claim is an open transitional term which means the subsequently identified claim elements are a nonexclusive listing i.e, anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method of operating a direct-fired inclined counter-flow rotary kiln for the thermal treatment of material, the rotary kiln presenting a longitudinal axis around which the kiln rotates, said longitudinal axis being inclined with respect to the horizontal plane and extending longitudinally between an upper inlet end and a lower outlet end of the kiln, the kiln having an internal length Lint of from 20 m to 100 m and an internal diameter Dint and presenting a ratio Lint/Dint from 10 to 100, said method comprising the steps of:

introducing material to be treated into the kiln at the inlet end and subjecting the introduced material to thermal treatment within the kiln, after which the treated material is evacuated from the kiln at the outlet end;

introducing a main fuel and a main oxidant into the kiln at the outlet end so as to generate a main combustion of the main fuel with the main oxidant, said main combustion taking place in a main combustion zone inside the rotary kiln extending over a distance of ¼ to ⅓ of the internal length $L_{int}$ of the kiln from the outlet end, wherein combustion gases generated by said main combustion travel through the kiln from the main combustion zone towards the inlet end through a heat exchange zone in which no combustion takes place and in which heat is transferred from the combustion gases to the material travelling in counterflow with the combustion gases, said heat exchange zone being located upstream of the main combustion zone, the combustion gases leaving the main combustion zone optionally containing combustible substances generated by an incomplete main combustion of the main fuel;

allowing the combustion gases generated by said main combustion to be evacuated from the kiln via a flue gas outlet situated at the inlet end of the kiln;

introducing supplementary oxidant into the kiln at the inlet end and also optionally supplementary fuel, wherein:

the supplementary oxidant is introduced into the kiln without the optional supplementary fuel when combustible substances are present in the combustion gases from the main combustion zone;

the supplementary oxidant is introduced into the kiln with the supplementary fuel when no combustible substances are present in the combustion gases from the main combustion zone; and the supplementary oxidant introduced into the kiln has an oxygen content of from 50% vol to 100% vol;

combustion of the supplementary oxidant with the combustible substances, when present, or combustion of the supplementary oxidant with the supplementary fuel, when not present, is carried out in a supplementary combustion zone inside the rotary kiln which extends over a distance from the inlet end of at most ¼ of the internal length $L_{int}$, so that the combustion gases generated by the supplementary combustion are evacuated together with the combustion gases generated by the main combustion via the flue gas outlet of the kiln.

2. The method of claim 1, wherein the combustion gases from the main combustion zone contain combustible substances and no supplementary fuel is introduced into the kiln.

3. The method of claim 2, wherein the main oxidant and the main fuel are introduced into the kiln at a main equivalence ratio from 0.85 to 1.05.

4. The method of claim 1, wherein the main oxidant and the main fuel are introduced into the kiln at the outlet end so as to provide complete combustion of the main fuel in the main combustion zone and whereby supplementary fuel and supplementary oxidant are introduced into the kiln at the inlet end.

5. The method of claim 1, wherein the combustion gases from the main combustion zone enter the supplementary combustion zone at a temperature of at least 650° C. and preferably at least 700° C. and more preferably at least 750° C.

6. The method of claim 1, wherein the heat exchange zone bridges a longitudinal middle M of the kiln.

7. The method of claim 1, whereby the main oxidant is introduced into the kiln in multiple main oxidant jets.

8. The method of claim 1, wherein at least part of the supplementary oxidant is injected into the kiln supersonically.

9. The method of claim 1, wherein several jets of supplementary oxidant are injected into the kiln with an injection direction so that the injection directions of said supplementary oxidant jets meet at a point located on or in the vicinity of the longitudinal axis of the kiln.

10. The method of claim 1 whereby the material to be thermally treated is at least partially dried in the supplementary combustion zone.

11. A method of operating a direct-fired inclined counterflow rotary kiln for the thermal treatment of material, the rotary kiln presenting a longitudinal axis around which the kiln rotates, said longitudinal axis being inclined with respect to the horizontal plane and extending longitudinally between an upper inlet end and a lower outlet end of the kiln, the kiln having an internal length Lint of from 20 m to 100 m and an internal diameter Dint and presenting a ratio Lint/Dint from 10 to 100, said method comprising the steps of:

introducing material to be treated into the kiln at the inlet end and subjecting the introduced material to thermal treatment within the kiln, after which the treated material is evacuated from the kiln at the outlet end;

introducing a main fuel and a main oxidant into the kiln at the outlet end so as to generate a main combustion of the main fuel with the main oxidant, said main combustion taking place in a main combustion zone inside the rotary kiln extending over a distance of ¼ to ⅓ of the internal length $L_{int}$ of the kiln from the outlet end, wherein combustion gases generated by said main combustion travel through the kiln from the main combustion zone towards the inlet end through a heat exchange zone in which no combustion takes place and in which heat is transferred from the combustion gases to the material travelling in counterflow with the combustion gases, said heat exchange zone being located upstream of the main combustion zone, the combustion gases leaving the main combustion zone optionally containing combustible substances generated by an incomplete main combustion of the main fuel;

allowing the combustion gases generated by said main combustion to be evacuated from the kiln via a flue gas outlet situated at the inlet end of the kiln;

introducing supplementary oxidant into the kiln at the inlet end and also optionally supplementary fuel, wherein:

the combustion gases from the main combustion zone contain combustible substances and both supplementary oxidant and supplementary fuel are introduced into the kiln;

the supplementary oxidant introduced into the kiln has an oxygen content of from 50% vol to 100% vol; and combustion of the supplementary oxidant with the combustible substances or combustion of the supplementary oxidant with the optional supplementary fuel is carried out in a supplementary combustion zone inside the rotary kiln which extends over a distance from the inlet end of at most ¼ of the internal length $L_{int}$, so that the combustion gases generated by the supplementary combustion are evacuated together with the combustion gases generated by the main combustion via the flue gas outlet of the kiln.

12. An installation for the thermal treatment of material, comprising:

a direct-fired counterflow kiln rotatable around a longitudinal axis, said longitudinal axis being inclined with respect to the horizontal plane and extending between an upper inlet end and a lower outlet end, the kiln having a longitudinal middle M halfway between the inlet end and the outlet end and having an internal length Lint of from 20 m to 100 m and an internal diameter Dint and presenting a ratio Lint/Dint from 10 to 100, the kiln comprising a longitudinal middle section presenting no oxidant or fuel inlets which extends over at least 50% of the internal length Lint of the kiln and which bridges the longitudinal middle M;

a material supply system for supplying material to be treated to the kiln, the material supply system being in fluid connection with the inlet end of the kiln and adapted for introducing material to be treated at a controlled supply rate into the kiln at the inlet end;

a material evacuation system in fluid connection with the outlet end and adapted to evacuate thermally treated material from the kiln;

at least one main burner located at the outlet end of the kiln and adapted for introducing main fuel and main oxidant into a main combustion zone adjacent the outlet end of the kiln;

at least one supplementary burner located at the inlet end of the kiln and adapted for introducing supplementary oxidant and supplementary fuel into a supplementary combustion zone adjacent the inlet end of the kiln;

a flue gas outlet situated at the inlet end of the kiln and adapted for evacuating combustion gases from the kiln, wherein the at least one supplementary burner is in fluid connection with a source of an oxidant having an oxygen content of from 50% vol to 100% vol.

* * * * *